US008676168B2

(12) United States Patent
Storozuk

(10) Patent No.: US 8,676,168 B2
(45) Date of Patent: Mar. 18, 2014

(54) METHOD AND APPARATUS FOR MANAGING MESSAGE NOTIFICATIONS

(75) Inventor: John Storozuk, Waterloo (CA)

(73) Assignee: BlackBerry Limited, Waterloo (CA)

( * ) Notice: Subject to any disclaimer, the term of this patent is extended or adjusted under 35 U.S.C. 154(b) by 378 days.

(21) Appl. No.: 12/389,485

(22) Filed: Feb. 20, 2009

(65) Prior Publication Data

US 2010/0216433 A1 Aug. 26, 2010

(51) Int. Cl.
*H04M 1/725* (2006.01)
(52) U.S. Cl.
USPC .... 455/412.2; 455/66.1; 340/7.58; 340/407.1
(58) Field of Classification Search
USPC ......... 455/41.2, 66.1, 412.2, 415, 418, 556.1, 455/567, 575.6; 340/7.58, 407.1, 691.1, 340/815.89
See application file for complete search history.

(56) References Cited

U.S. PATENT DOCUMENTS

| 6,344,795 | B1 | | 2/2002 | Gehlot | |
|---|---|---|---|---|---|
| 6,362,740 | B1 | * | 3/2002 | Jung | 340/584 |
| 7,027,567 | B1 | * | 4/2006 | Scott et al. | 379/88.12 |
| 2005/0176410 | A1 | * | 8/2005 | Brooking et al. | 455/412.1 |
| 2006/0079279 | A1 | | 4/2006 | Lin | |
| 2007/0287507 | A1 | * | 12/2007 | Aton et al. | 455/567 |
| 2008/0081674 | A1 | * | 4/2008 | Orr | 455/567 |
| 2010/0161683 | A1 | * | 6/2010 | Leeds et al. | 707/803 |
| 2010/0210313 | A1 | * | 8/2010 | Huang et al. | 455/567 |

FOREIGN PATENT DOCUMENTS

| EP | 1100060 A2 | | 5/2001 | |
|---|---|---|---|---|
| JP | 405022383 A | * | 1/1993 | .............. H04M 1/00 |
| KR | 595468 B1 | * | 6/2006 | .............. H04M 1/40 |
| WO | 2004071113 A1 | | 8/2004 | |
| WO | 2005/064895 A1 | | 7/2005 | |

OTHER PUBLICATIONS

European Patent Application No. EP 09 15 3309 Search Report dated Jul. 2. 2009.
Wikipedia—Thermoelectric cooling http://en.wikipedia.org/wiki/Thermoelectric_cooling (accessed Feb. 19, 2009).
Lam, R. H. W., Elhajj, I., Li, W. J., Xi, N., "A bone reaming system with tactile temperature display," Proceedings of the 15th IFAC World Congress, 2002, vol. 15, Part 1, Barcelona, Spain.
http://www.halfbakery.com/idea/Caller_27s_20mood_20ID—reference to a temperature sensitive plate no specific details.

* cited by examiner

*Primary Examiner* — Michael Faragalla
*Assistant Examiner* — Gerald Oliver
(74) *Attorney, Agent, or Firm* — Perry + Currier Inc.

(57) ABSTRACT

According to embodiments described in the specification, a method and apparatus for managing message notifications in a portable electronic device including a thermal notifier output device. The method comprises receiving a message at the portable electronic device; determining a notification setting responsive to receiving the message; and generating a thermal notification signal at the thermal notifier output device according to the determined notification setting. The thermal notification signal provides non-visual identification of an originator of the received message.

15 Claims, 6 Drawing Sheets

| Phone # | Name | Address | Email | Group |
|---|---|---|---|---|
| 555-5551 | Alice | 100 1$^{st}$ Street | alice@abc.com | Work |
| 555-5552 | Ace | 200 2$^{nd}$ Street | ace@abc.com | Work VIP |
| 555-5553 | Andrew | 300 3$^{rd}$ Street | andy@xyz.com | Friends |
| 555-5554 | Alan | 400 4$^{th}$ Street | al@home.com | Family |
| 555-5555 | Amy | 500 5$^{th}$ Street | amy@mno.com | |

58

| Meeting | |
|---|---|
| Ring | Off |
| Vibrate | On |
| Thermal | |
| Work | Hot |
| Work VIP | Cold |
| Other | Neutral |

FIG. 6

METHOD AND APPARATUS FOR MANAGING MESSAGE NOTIFICATIONS

FIELD

The specification relates generally to message notifications, and specifically to a method and apparatus for managing message notifications in a portable electronic device.

BACKGROUND

As the use of hand-held communication devices such as smart telephones and cellular telephones continues to grow, so too does the potential for disruptive notifications from such devices. For example, a ring tone sounding during a meeting or conversation is disruptive to all those involved in the meeting or conversation. Under various prior art approaches, ring tones may be replaced by vibration alerts to reduce the likelihood of a call notification being disruptive. Vibration alerts, however, may not help to identify the source of the incoming call or other communication. Such identification may still disadvantageously require a visual inspection of the device, which can be inconvenient and embarrassing, and may in fact be impossible, for example in the case of a visually impaired user.

BRIEF DESCRIPTIONS OF THE DRAWINGS

Embodiments are described with reference to the following figures, in which:

FIG. 6 depicts a schematic representation of a notification setting maintained at the portable electronic device of FIG. 1, according to a non-limiting embodiment.

DETAILED DESCRIPTION OF THE EMBODIMENTS

Figure 1:
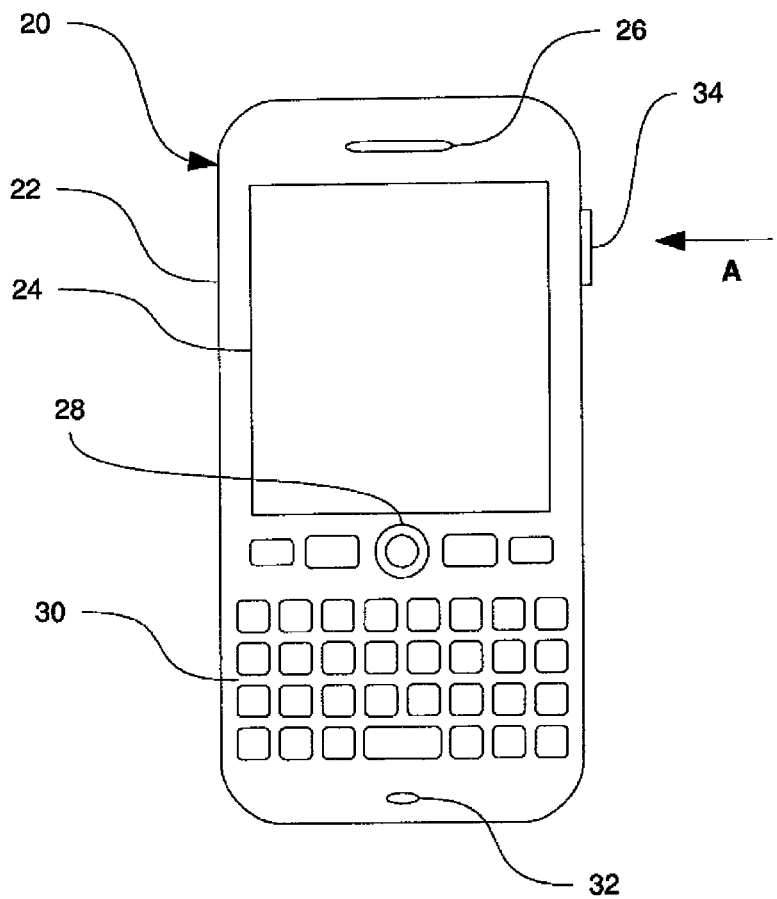
FIG. 1 depicts a schematic representation of a portable electronic device, according to a non-limiting embodiment.

Referring now to FIG. 1, a schematic representation of a computing device in the form of a portable electronic device is indicated generally at 20. In the present embodiment, portable electronic device 20 is based on the computing environment and functionality of a hand-held wireless communication device. It will be understood, however, that portable electronic device 20 is not limited to a hand-held wireless communication device. Various electronic devices are possible, such as cellular telephones, smart telephones, and laptop computers. Referring again to FIG. 1, portable electronic device 20 includes a housing 22, a plurality of output devices and a plurality of input devices. Housing 22 is constructed of a suitable material, as will occur to those skilled in the art. In a present embodiment, the output devices of portable electronic device 20 include a display 24 framed by housing 22. Display 24 may be, for example, an LCD display, and may also be combined with or implemented as a touch screen. Portable electronic device 20 also includes a further output device in the form of a speaker 26. In a present embodiment, the input devices of portable electronic device 20 include a pointing device 28 in the form of a trackball. It will be understood that in some embodiments, pointing device 28 may also comprise a touch screen integrated with display 24. The input devices of portable electronic device 20 can also include a keypad 30, a microphone 32 and an exit key 34 (which can be depressed in the direction of arrow "A").

Figure 2:
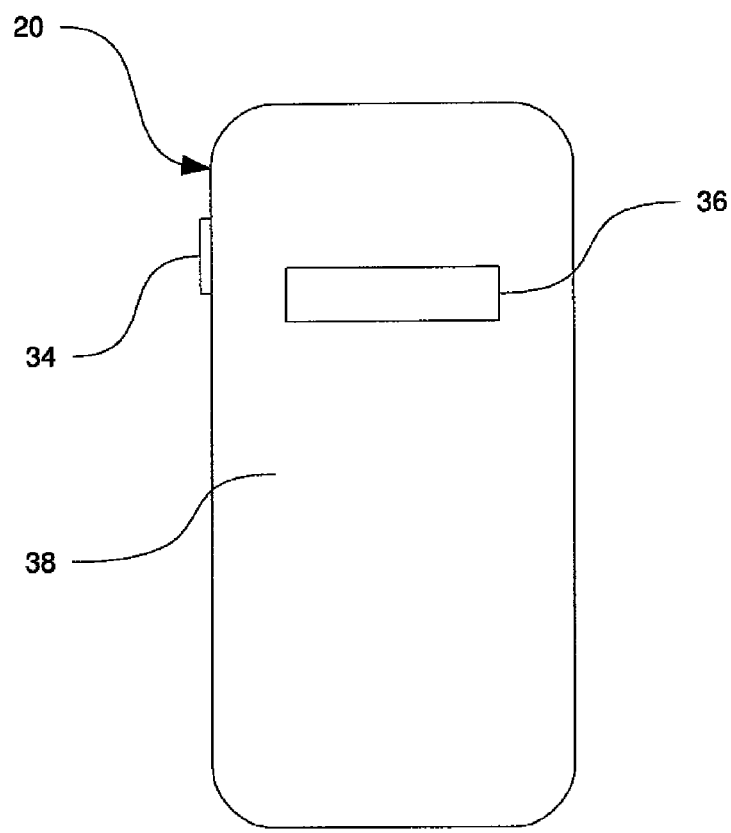
FIG. 2 depicts a schematic representation of the reverse side of the portable electronic device of FIG. 1, according to a non-limiting embodiment.

With reference now to FIG. 2, a schematic representation of the reverse side of portable electronic device 20 as shown in FIG. 1 is depicted. In addition to exit key 34 and other input and output devices as described above, portable electronic device 20 includes a further output device in the form of a thermal notifier 36. Thermal notifier 36 provides non-visual identification of an originator of a message received at portable electronic device 20, as will be described in further detail below.

In a present embodiment, a surface of thermal notifier 36 is substantially flush with an exterior surface 38 of the reverse side of housing 22 of portable electronic device 20. Thermal notifier 36 thus occupies a portion of the external surface of portable electronic device 20. Thermal notifier 36 can be a strip of thermally conductive material, as will occur to those skilled in the art. In other embodiments (not shown), the size and placement of thermal identifier 36 may be varied, and multiple thermal identifiers 36 may be provided. As will be described in further detail below, in a present embodiment the temperature of thermal notifier 36 can be biased above ambient temperature to generate a "Hot" thermal notification signal and below ambient temperature to generate a "Cold" thermal notification signal. In the absence of bias, the temperature of thermal notifier 36 remains substantially equal to ambient temperature, and a "Neutral" thermal notification signal is generated. It will be appreciated that the "Neutral" thermal notification signal is equivalent to the absence of a thermal notification signal. If a bias is applied and then removed, the temperature of thermal notifier 36 returns from a hotter-than-ambient or colder-than-ambient temperature to substantially ambient temperature.

It will now be apparent to those skilled in the art that various bias mechanisms may be used to bias the temperature of thermal notifier 36 in order to generate the above "Hot," and "Cold" thermal notification signals. For example, in some embodiments exothermic and endothermic chemical reactions can be used. Exothermic reactions can conduct heat to thermal notifier 36, thereby increasing the temperature of thermal notifier 36. Endothermic reactions can draw heat from thermal notifier 36, thereby decreasing the temperature of thermal notifier 36. In such embodiments, removeable cartridges (not shown) containing necessary reagents for the above-mentioned reactions may be provided within housing 22 of portable electronic device 20. In a present embodiment, the temperature of thermal notifier 36 is biased as described above by way of resistive heating and thermoelectric cooling.

Figure 3:
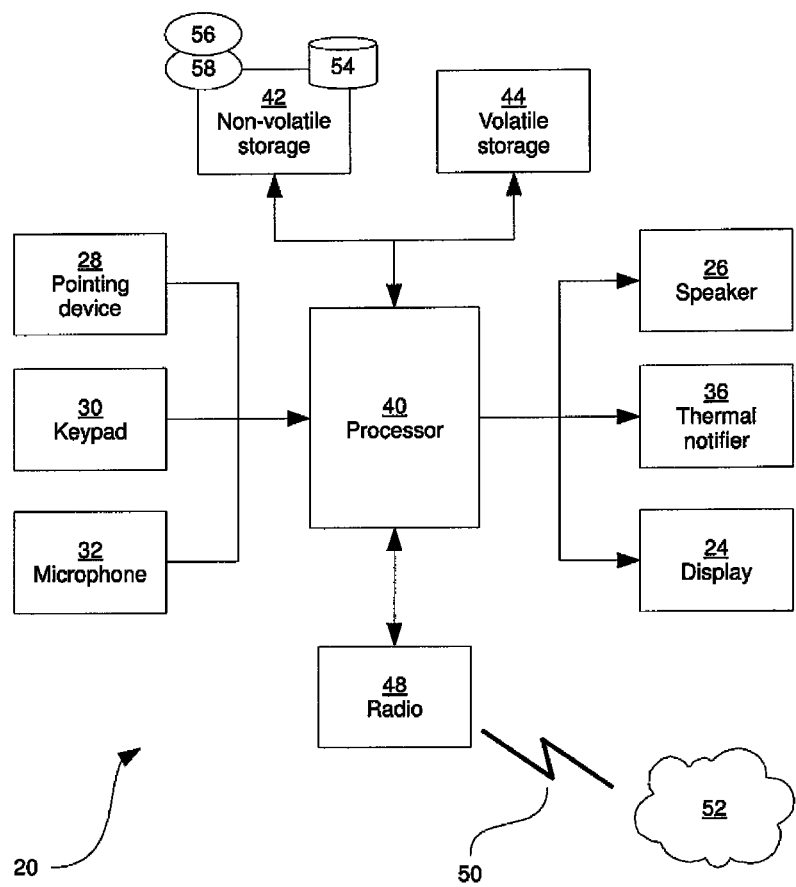
FIG. 3 depicts a schematic block diagram showing various internal components of the portable electronic device of FIG. 1, according to a non-limiting embodiment.

Referring now to FIG. 3, a schematic block diagram shows portable electronic device 20 in greater detail. It will be understood that the structure in FIG. 3 is purely exemplary, and contemplates a device that may be used for both wireless voice (e.g. telephony) and wireless data (e.g. email, web browsing, text) communications. Portable electronic device 20 includes input devices such as pointing device 28, keypad 30 and microphone 32. Other input devices, such as a camera lens and associated image sensor (not shown), are also contemplated. Portable electronic device 20 is based on a microcomputer that includes a processor 40. Input from pointing device 28, keypad 30 and microphone 32 can be received at processor 40. Processor 40, in turn, communicates with a non-volatile storage unit 42 (e.g. read only memory ("ROM"), Electrically Eraseable Programmable Read Only Memory ("EEPROM"), flash memory) and a volatile storage unit 44 (e.g. Random Access Memory ("RAM")). Processor 40 also communicates with output devices such as display 24, speaker 26 and thermal notifier 36, and can thus cause the output devices to provide various output signals.

Portable electronic device 20 also includes a network interface such as a radio 48 communicating with processor 40. Radio 48 provides wireless communication capabilities to portable electronic device 20 by way of a wireless link 50 connecting portable electronic device 20 to a network 52. Link 50 between portable electronic device 20 and network 52 may be based in a present embodiment on core mobile network infrastructure (e.g. Global System for Mobile communications ("GSM"); Code Division Multiple Access ("CDMA"); CDMA 2000; 3G; 4G). Link 50 may also be based on wireless local area network ("WLAN") infrastructures such as the Institute for Electrical and Electronic Engineers ("IEEE") 802.11 Standard (and its variants), Bluetooth or the like, or hybrids thereof. Note that in an exemplary variation of portable electronic device 20, link 50 may also be a wired connection and radio 48 may be a network interface capable of receiving and communicating over the wired connection.

Programming instructions that implement the functional teachings of portable electronic device 20 as described herein are typically maintained in a computer readable storage medium such as non-volatile storage unit 42. The programming instructions are used by processor 40, which makes appropriate utilization of volatile storage unit 44 during the execution of such programming instructions. Non-volatile storage unit 42 persistently maintains a contacts database 54, a messaging application 56 and a profile application 58. Messaging application 56 and profile application 58 can be executed on processor 40, making use of non-volatile storage unit 42 and volatile storage unit 44 as appropriate. It will be understood that either or both of messaging application 56 and profile application 58 may be integrated with other applications that will occur to those skilled in the art according to the desired configuration and functioning of portable electronic device 20.

Figure 4:
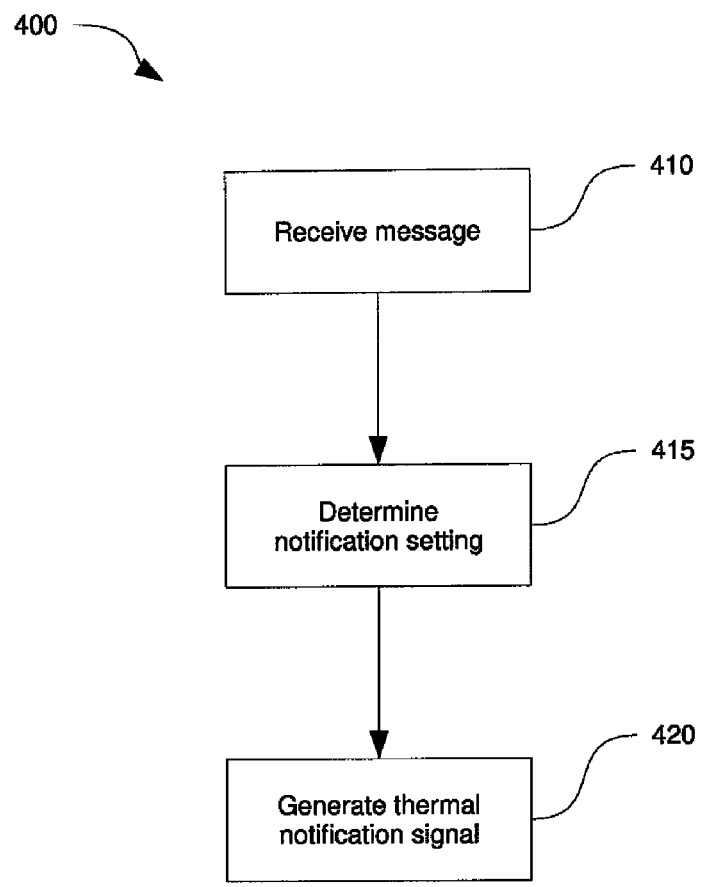
FIG. 4 depicts a method for managing message notifications in the portable electronic device of FIG. 1, according to a non-limiting embodiment.

Referring now to FIG. 4, a flowchart is provided depicted a method, indicated generally at 400, for managing message notifications in a portable electronic device. Method 400 will be described in conjunction with its exemplary performance on portable electronic device 20, but it will be understood that portable electronic device 20 and method 400 may both be varied and that those variations are within the scope of the present teachings.

Method 400 begins at block 410 with the receipt of a message at portable electronic device 20. A message as used herein may be any of a variety of communications. For example, in a present embodiment, the message may be an incoming voice call. In other embodiments, the message may be a text message, an email or the like. It will now be apparent that message application 56, in other embodiments, can be replaced by multiple applications, each directed to the processing of different types of communications. Continuing with the present exemplary performance of method 400, processor 40 of portable electronic device 20 is configured, via execution of message application 56, to communicate with radio 48 to receive the message at block 410 from network 52 (via link 50).

In a present embodiment, block 410 of method 400 also includes the receipt of an originator identifier for the message. The originator identifier, in a present embodiment, is a telephone number of an entity from which the received message originated. It will now be apparent that other originator identifiers are also suitable. The received originator identifier can be used, as will be described in further detail below, to search contacts database 54. For the present exemplary performance of method 400, the originator identifier received at block 410 is "555-5552."

Figure 5:
FIG. 5 depicts a schematic representation of a contacts database maintained at the portable electronic device of FIG. 1, according to a non-limiting embodiment.

An exemplary contacts database 54 is shown in FIG. 5. Contacts database 54 contains information relating to various people and/or entities. It will be understood that the columns of contacts database 54 shown in FIG. 5 are purely exemplary, and that other configurations of contacts database 54 may also occur to those skilled in the art. Of particular note, contacts database 54 includes a "Phone #" column and a "Group" column. The "Phone #" column contains an originator identifier in the form of a telephone number for each contact. It will be noted that the "Email" column contains another type of originator identifier in the form of an email address. The "Group" column contains an indication of which group of contacts a given contact falls into. For example, the contact named "Alice" has been placed within the "Work" group. The contact named "Ace" has been placed within the "Work VIP" group. This can indicate that messages received from Ace are of a different priority than messages received from Alice. It will now be apparent that many configurations exist for contacts database 54 and that many combinations of groups may be used to organize contacts within contacts database 54. In other embodiments (not shown), the "Group" column may be omitted from contacts database 54 and instead stored in portable electronic device 20 as a separate database.

Referring back to FIG. 4, method 400 continues at block 415. At block 415, a notification setting is determined in response to the receipt of a message and originator identifier at block 410. At block 415, processor 40 is configured, via execution of profile application 58, to determine a currently active notification setting for the message received at block 410. Profile application 58 can maintain a plurality of notification settings, any one of which may be the active notification setting at a given time. An exemplary notification setting is represented schematically in FIG. 6. FIG. 6 shows a "Meeting" notification setting maintained at portable electronic device 20 by profile application 58. The "Meeting" notification setting includes an indication that the audible "Ring" notification signal generated, for example, by speaker 26 of portable electronic device 20, is "Off" (disabled). The "Meeting" notification setting further includes an indication that the "Vibration" notification signal is "On" (enabled). Of particular note, the notification setting contains indications of various thermal notification signals to be generated by thermal notifier 36. In a present embodiment as depicted in FIG. 6, the "Hot" thermal notification signal is indicated for messages received from contacts associated with the "Work" group. Similarly, the "Cold" thermal notification signal is indicated for messages received from contacts associated with the "Work VIP" group, and the "Neutral" thermal notification signal is indicated for all other contacts (that is, contacts belonging to other groups or belonging to no group). As noted above, the "Neutral" indication may instead be replaced with an "Off" or "Not Applicable" indication, as the "Neutral" thermal notification signal in fact represents a lack of thermal notification signal.

It will now be apparent to those skilled in the art that many variations may be made to the notification settings of profile application 58. For example, additional settings (such as ring volume and ring tone, as well as vibration frequency and length) may be included in each notification setting. Further, the indicated thermal notification signal may be varied. For example, an indication may be provided for contacts belonging to no groups but appearing in contact database 54, while a separate indication may be provided for contacts not appearing in contact database 54. These and other variations are within the scope of the present teachings.

Returning to FIG. 4, for the present exemplary performance of method 400, the "Meeting" notification setting is the active notification setting. Thus, at block 415 of method 400, processor 40 of portable electronic device is configured, via execution of profile application 58, to determine the "Meeting" notification setting.

Method 400 continues with the performance of block 420. At block 420, a thermal notification signal is generated at thermal notifier 36 according to the notification setting determined at block 415 and the originator identifier received at block 410. Processor 40 of portable electronic device 20 is configured to search contacts database 54, via execution of messaging application 56, for entries matching the originator identifier received at block 410. As seen in FIG. 5, the originator identifier "555-5552" received at block 410 matches the second entry of contacts database 54, corresponding to the contact named "Ace." It will be noted that the contact "Ace" is assigned to the group "Work VIP." Processor 40 or portable electronic device 20 is therefore configured to cause thermal notifier 36 to generate a thermal notification signal corresponding to the thermal notification signal associated with the "Work VIP" group in the active notification setting (the "Meeting" notification setting). Thus, in the present exemplary performance of method 400, processor 40 causes thermal notifier 36 to generate the "Cold" thermal notification signal in response to the message received at block 410.

In order to generate the "Cold" thermal notification signal, processor 40 of portable electronic device 20 is configured to apply a bias to reduce the temperature of at least a portion of thermal notifier 36 below ambient temperature. It will now be appreciated that in other performances of method 400, processor 40 may instead cause the temperature of at least a portion of thermal notifier 36 to increase (corresponding to the "Hot" thermal notification signal), or to remain substantially unchanged (corresponding to the "Neutral," or lack of, thermal notification signal). It will also be appreciated that the terms "increase" and "decrease" used above are merely for explanatory purposes. The various thermal notification signals may be associated with specific temperatures, or may be associated with increments above or below current ambient temperature. In some embodiments (not shown), portable electronic device 20 can thus include an additional input device in the form of a temperature sensor to determine the ambient temperature.

In a present embodiment, the thermal notification signal generated at block 420 of method 400 is maintained for a predetermined amount of time, after which the temperature of thermal notifier 36 returns substantially to ambient temperature. In other embodiments (not shown), the predetermined amount of time may be set for each notification setting maintained by profile application 58.

Although the embodiments described herein provide "Hot" and "Cold" thermal notification signals, it will now be apparent that additional thermal notification signals may also be provided and generated at thermal notifier 36. Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method of managing message notifications in a portable electronic device including a thermal notifier output device, the method comprising:
   maintaining a plurality of notification settings in the portable electronic device;
   receiving a message at the portable electronic device;
   determining, responsive to receiving the message, a group identifier based on an identifier of the originator of the message; and determining a notification setting from among the plurality of notification settings based on the group identifier; the notification setting including a thermal notification indication associated with the group identifier, and at least one other notification indication;
   generating a thermal notification signal at the thermal notifier output device according to the thermal notification indication of the determined notification setting, wherein the thermal notification signal provides non-visual identification of the originator of the received message; and
   generating at least one other notification signal according to the at least one other notification indication of the determined notification setting, simultaneously with the thermal notification signal.

2. The method of claim 1, wherein the thermal notifier output device occupies a portion of an external surface of the portable electronic device.

3. The method of claim 1, wherein generating the thermal notification signal comprises one of:
   increasing the temperature of at least a portion of the thermal notifier output device above an ambient temperature; and
   decreasing the temperature of at least a portion of the thermal notifier output device below an ambient temperature.

4. The method of claim 1, further comprising:
   receiving, prior to generating the thermal notification signal, the identifier of the originator of the message.

5. The method of claim 1, further comprising:
   ceasing generation of the thermal notification signal after a predetermined time period.

6. A portable electronic device comprising:
   a network interface;
   a storage unit configured to maintain a plurality of notification settings;
   a thermal notifier output device; and
   a processor interconnected with the network interface, the storage unit and the thermal notifier output device, the processor configured to:
   receive a message at the portable electronic device;
   determine, responsive to receiving the message, a group identifier based on the group identifier of the originator of the message; and determining a notification setting from among the plurality of notification settings based on the group identifier; the notification setting including a thermal notification indication associated with the group identifier, and at least one other notification indication;
   generate a thermal notification signal at the thermal notifier output device according to the thermal notification indication of the determined notification setting, wherein the thermal notification signal provides non-visual identification of the originator of the received message; and generate at least one other notification signal according to the at least one other notification indication of the determined notification setting, simultaneously with the thermal notification signal.

7. The portable electronic device of claim 6, wherein the thermal notifier output device occupies a portion of an external surface of the portable electronic device.

8. The portable electronic device of claim 6 wherein the thermal notification signal comprises one of:
increasing the temperature of at least a portion of the thermal notifier output device above an ambient temperature; and
decreasing the temperature of at least a portion of the thermal notifier output device below an ambient temperature.

9. The portable electronic device of claim 6, wherein the processor is further configured to receive, prior to generating the thermal notification signal, the identifier of the originator of the message.

10. The portable electronic device of claim 6, wherein the processor is further configured to cease generation of the thermal notification signal after a predetermined time period.

11. A non-transitory computer readable storage medium storing computer readable programming instructions executable by a processor for implementing a method comprising:
maintaining a plurality of notification settings in the portable electronic device;
receiving a message at a portable electronic device;
determining, responsive to receiving the message, a group identifier based on an identifier of the originator of the message; and determining a notification setting from among the plurality of notification settings based on the group identifier; the notification setting including a thermal notification indication associated with the group identifier, and at least one other notification indication;
generating a thermal notification signal at a thermal notifier output device of the portable electronic device according to the thermal notification indication of the determined notification setting, wherein the thermal notification signal provides non-visual identification of the originator of the received message; and
generating at least one other notification signal according to the at least one other notification indication of the determined notification setting, simultaneously with the thermal notification signal.

12. The non-transitory computer readable storage medium of claim 11, wherein the thermal notifier output device occupies a portion of an external surface of the portable electronic device.

13. The non-transitory computer readable storage medium of claim 11, wherein generating the thermal notification signal comprises one of:
increasing the temperature of at least a portion of the thermal notifier output device above an ambient temperature; and
decreasing the temperature of at least a portion of the thermal notifier output device below an ambient temperature.

14. The non-transitory computer readable storage medium of claim 11, the method further comprising:
receiving, prior to generating the thermal notification signal, the identifier of the originator of the message.

15. The non-transitory computer readable storage medium of claim 11, the method further comprising:
ceasing generation of the thermal notification signal after a predetermined time period.

* * * * *